United States Patent
Silverman et al.

(10) Patent No.: US 10,659,116 B1
(45) Date of Patent: May 19, 2020

(54) ENABLING UL-MU-MIMO WITH UL-OFDMA

(71) Applicant: Cisco Technology, Inc., San Jose, CA (US)

(72) Inventors: Matthew Aaron Silverman, Shaker Heights, OH (US); Guatam Bhanage, Milpitas, CA (US); Pooya Monajemi, San Jose, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 16/559,353

(22) Filed: Sep. 3, 2019

(51) Int. Cl.
*H04B 7/04* (2017.01)
*H04B 7/0452* (2017.01)
*H04W 74/08* (2009.01)
*H04B 7/0404* (2017.01)
*H04L 5/00* (2006.01)

(52) U.S. Cl.
CPC ......... *H04B 7/0452* (2013.01); *H04B 7/0404* (2013.01); *H04L 5/0007* (2013.01); *H04W 74/0833* (2013.01)

(58) Field of Classification Search
CPC ... H04B 7/0452; H04B 7/0404; H04L 5/0007; H04W 74/0833
See application file for complete search history.

(56) References Cited

U.S. PATENT DOCUMENTS

| | | | |
|---|---|---|---|
| 8,971,264 B2 | 3/2015 | Kwon | |
| 9,825,678 B2 | 11/2017 | Chu | |
| 10,299,261 B2 | 5/2019 | Chun | |
| 2016/0021678 A1 | 1/2016 | Merlin | |
| 2016/0150534 A1* | 5/2016 | Kwon | H04W 72/0446 370/338 |
| 2017/0170937 A1 | 6/2017 | Chun | |

* cited by examiner

*Primary Examiner* — Kabir A Timory
(74) *Attorney, Agent, or Firm* — Baker Botts, LLP (57) ABSTRACT

In one embodiment, a method includes identifying a plurality of wireless devices associated with the wireless network apparatus, identifying a subset of the plurality of wireless devices based on whether the wireless devices in the subset have a probability above a threshold to yield to each other via a clear channel assessment (CCA) and whether the wireless network apparatus can decode uplink signals simultaneously transmitted by the wireless devices in the subset over a common uplink resource, assigning the subset to an uplink resource, separating each wireless device in the subset to each of a plurality of groups, and transmitting, for each group, a steered downlink message indicating the assigned uplink resource for each wireless device in the group, wherein the wireless devices in each group are assigned to different uplink resources.

20 Claims, 6 Drawing Sheets

| | Group 1 | Group 2 | Not Grouped (OFDMA only) |
|---|---|---|---|
| RU 1 | Device 101 | Device 105 | |
| RU 2 | Device 102 | Device 106 | |
| RU 3 | Device 103 | Device 107 | |
| RU 4 | Device 104 | Device 108 | |
| RU 5 | | | Device 109 |
| | | | Device 110 |
| | . . . | . . . | Device 111 |
| RU N | | | |

| Group 1 | | | | | Group 2 | | | | | Not Grouped (OFDMA only) | | | |
|---|---|---|---|---|---|---|---|---|---|---|---|---|---|
| Device 101 | Device 102 | Device 103 | Device 104 | ... | Device 105 | Device 106 | Device 107 | Device 108 | ... | Device 109 | Device 110 | Device 111 | |
| RU 1 | RU 2 | RU 3 | RU 4 | RU 5 | | | | | ... | | | | RU N |

ENABLING UL-MU-MIMO WITH UL-OFDMA

TECHNICAL FIELD

The present disclosure relates generally to a field of wireless data communications, and more particularly, to enabling simultaneous Uplink Multi-User (MU) transmissions with Multi-Input and Multi-Output (MIMO) and Orthogonal Frequency-Division Multiple Access (OFDMA) technologies.

BACKGROUND

Wireless local area networks (WLAN)s provide means of transferring data between access points (AP)s and client devices using wireless signaling as defined in the IEEE 802.11 standards. The initial WLAN standards (802.11 a/b/g) were built upon an assumption that only one AP or client device could transmit on a specific channel at a time and the transmitting device would transmit only one set of information at once. Later, the 802.11n standard introduced methods for transmitting multiple information sets simultaneously using a technique known as multiple input multiple output (MIMO), but still with the assumption that only one device could transmit at a time and the information sets would be destined to only one client device or a group of client devices all receiving the same information. Later, the 802.11ac standard introduced methods of permitting an AP to transmit multiple sets of information simultaneously with each information set destined for different client devices using a technique referred to as downlink (DL) multi-user MIMO (MU-MIMO), but still with the limitation that only one device could transmit at once. The 802.11ax standard introduced uplink (UL) MU-MIMO and UL Orthogonal Frequency-Division Multi-Access (OFDMA) to further increase the throughput of the network. OFDMA segregates the spectrum in time-frequency resource units. The AP assigns resource units for reception or transmission to client devices. Through the central allocating of the resource units, contention overhead may be avoided, which increases efficiency in scenarios of dense deployments.

DESCRIPTION OF EXAMPLE EMBODIMENTS

Overview

In particular embodiments, a wireless network apparatus may identify a plurality of wireless devices associated with the wireless network apparatus. The wireless network apparatus may be an access point of a WLAN. The wireless network apparatus may identify a subset of the plurality of wireless devices based on whether the wireless devices in the subset have a probability above a threshold to yield to each other via a clear channel assessment (CCA) and whether the wireless network apparatus can decode uplink signals simultaneously transmitted by the wireless devices in the subset over a common uplink resource. The wireless network apparatus may assign the subset to an uplink resource. The uplink resource may comprise one or more sub-carriers. The wireless network apparatus may separate each wireless device in the subset to each of a plurality of groups. A group may comprise wireless devices that are able to receive data from a common steered downlink message from the wireless network apparatus. The wireless network apparatus may transmit a steered downlink message to a group. The steered downlink message may indicate the assigned uplink resource for each wireless device in the group to the group. The wireless devices in each group may be assigned to different uplink resources.

Example Embodiments

Figure 1A:
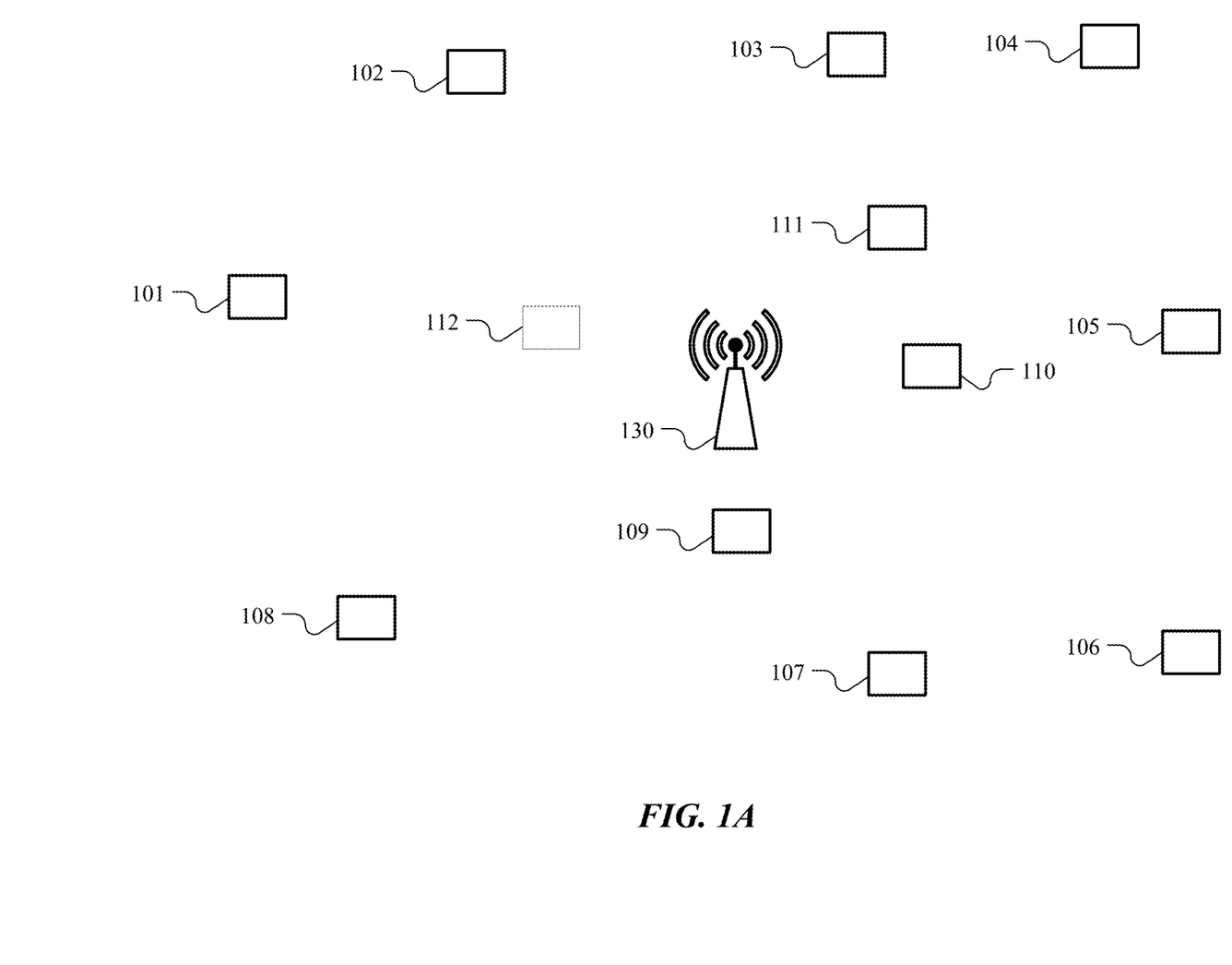
FIG. 1A illustrates an example WLAN network.

FIG. 1A illustrates an example WLAN network. In particular embodiments, a wireless network apparatus 130 may identify a plurality of wireless devices 101-112 associated with the wireless network apparatus 130. The wireless network apparatus 130 may be an access point of a WLAN. The plurality of wireless devices 101-112 may be associated with one or more uplink data messages to the wireless network apparatus 130. The wireless network apparatus 130 may determine that the plurality of wireless devices 101-112 are associated with the one or more uplink data messages by receiving buffer status reports from the plurality of wireless devices 101-112. As an example and not by way of limitation, illustrated in FIG. 1A, an access point 130 of a WLAN network may assign uplink resource to the wireless devices that are associated with one or more uplink messages to the access point 130 in an efficient manner. The access point 130 may need to determine which wireless devices among the plurality of devices are associated with uplink messages. In particular embodiments, the access point 130 may determine that a wireless device is associated with one or more uplink messages based on a buffer status report from the wireless device. In particular embodiments, the access point 130 may allocate uplink resources to all the wireless devices that have established associations with the access point 130. Although this disclosure describes identifying wireless devices that uplink resources need to be assigned to in a particular manner, this disclosure contemplates identifying wireless devices that uplink resources need to be assigned to in any suitable manner.

Figure 1B:
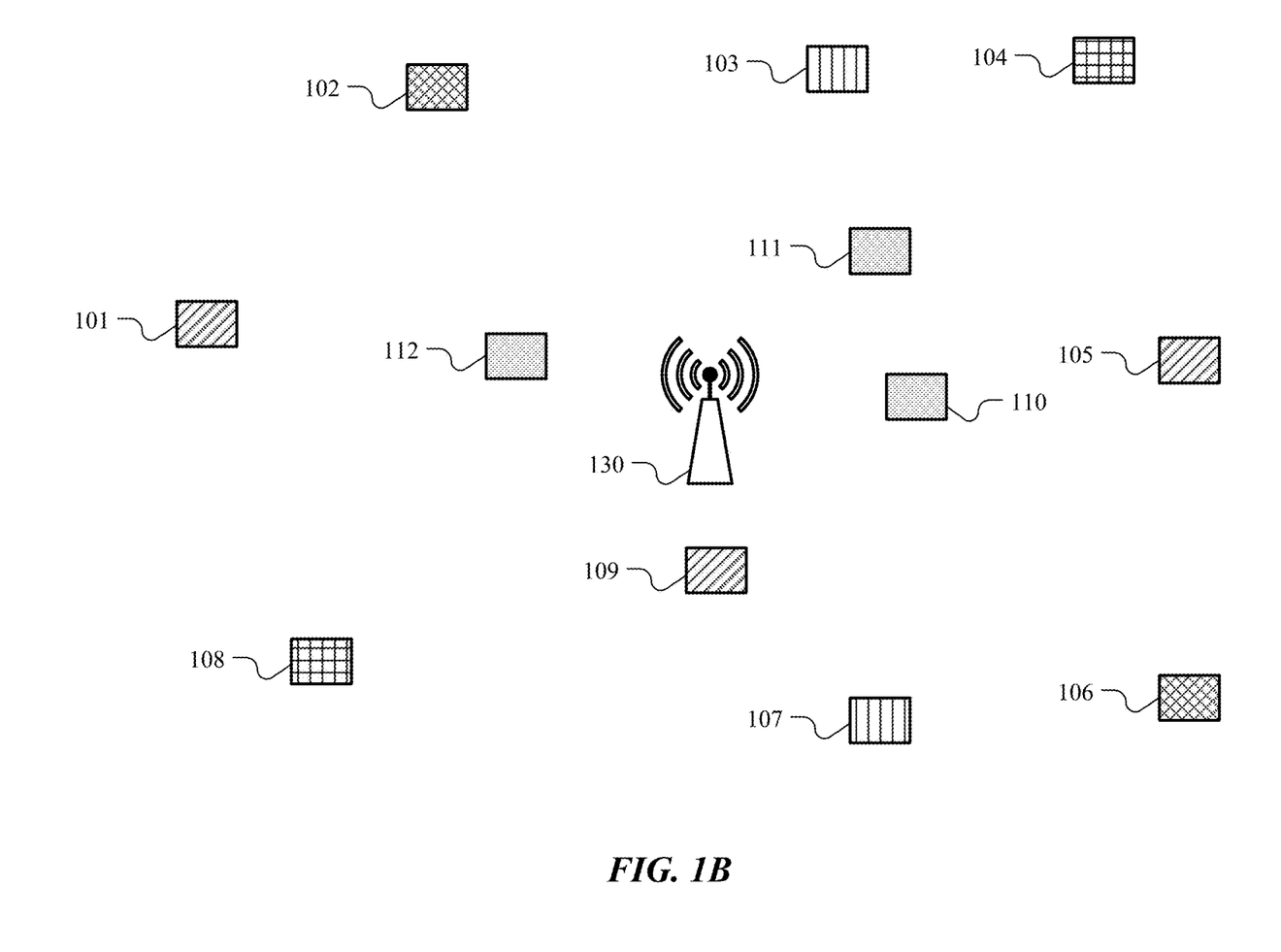
FIG. 1B illustrates example subsets of a plurality of wireless devices in a WLAN network.

In particular embodiments, the wireless network apparatus 130 may identify a subset of the plurality of wireless devices based on whether the wireless devices in the subset have a probability above a threshold to yield to each other via a clear channel assessment (CCA) and whether the wireless network apparatus 130 can decode uplink signals simultaneously transmitted by the wireless devices in the subset over a common uplink resource. With an original design of 802.11, any wireless device may not transmit while another is already transmitting on the same channel. The 802.11-2016 standard defines a physical carrier sense mechanism to determine whether the RF medium is busy. Physical carrier sense may be performed constantly by all wireless devices that are not transmitting or receiving. When a device performs a physical carrier sense, the device may be actually listening to the channel to see whether any other RF transmissions are occupying the channel. Physical carrier sense has two purposes: (1) to determine whether a frame transmission is destined to a wireless device to receive; (2) to determine whether the medium is busy before transmitting. The medium must be clear before a wireless device can transmit. To achieve these two physical carrier sense goals, the wireless devices may use a CCA to appraise the RF medium. The CCA may involve listening for RF transmissions at the Physical layer. A main objective of the CCA may be avoiding collisions at the receiving device. However, with recent developments in wireless technologies, especially by utilizing multiple antennas, a wireless network apparatus 130 may be able to receive simultaneous transmissions from multiple wireless devices. If two wireless devices yield to each other while their simultaneous transmissions can be decoded by the wireless network apparatus 130, the network may not utilize the radio resources in the most efficient manner. The wireless network apparatus 130 may try to allocate a common uplink resource to two wireless devices, if the wireless network apparatus 130 may decode the simultaneous transmissions from the two wireless devices successfully, and if the two wireless network devices do not yield to each other via a CCA. Since the two wireless devices do not yield each other, uplink transmissions from the two wireless devices may frequently overlap each other, which can be decoded by the wireless network apparatus 130. The overall network throughput may improve. FIG. 1B illustrates example subsets of a plurality of wireless devices in a WLAN network. As an example and not by way of limitation, illustrated in FIG. 1B, wireless devices 101, 105 and 109 may not yield to each other via a CCA. In other words, the wireless devices 101, 105, and 109 are hidden to each other. The access point 130 may identify the wireless devices 101, 105 and 109 as a subset because the wireless devices 101, 105 and 109 are hidden to each other and the simultaneous uplink transmission from the wireless devices 101, 105 and 109 can be decoded by the access point 130. As another example and not by way of limitation, wireless devices 102 and 106 are hidden to each other and the access point 130 can decode the simultaneous uplink transmissions from the wireless devices 102 and 106. Thus, the access point 130 may identify the wireless device 102 and 106 as a subset. Likewise, the access point 130 may identify 103 and 107 as a subset, and may identify 104 and 108 as a subset. As yet another example and not by way of limitation, the access point 130 may not be able to determine a subset for wireless devices 110, 111 and 112 because the wireless devices 110, 111 and 112 may not be hidden from any wireless device. In particular embodiments, the access point 130 may not be able to determine a subset for the wireless devices 110, 111 and 112 because their uplink transmissions may not be successfully received by the access point with any other uplink transmissions. Although this disclosure describes identifying a subset of wireless devices in a particular manner, this disclosure contemplates identifying a subset of wireless devices in any suitable manner.

In particular embodiments, the wireless network apparatus 130 may identify the subset of the plurality of wireless devices by identifying wireless devices that may not yield to each other via a CCA. In particular embodiments, the wireless network apparatus 130 may determine that a first wireless device may not yield to a second wireless device via a CCA when the wireless network apparatus 130 receives an uplink message from the first wireless device while the wireless network apparatus 130 is receiving an uplink message from the second wireless device. The fact that the first wireless device started an uplink transmission in the middle of an uplink transmission by the second wireless device may indicate that the first wireless device may not yield to the second wireless device via a CCA. As an example and not by way of limitation, illustrated in FIG. 1B, the access point 130 may determine that wireless device 101 does not yield to wireless device 105 via a CCA when the access point 130 receives an uplink transmission from the wireless device 101 in the middle of receiving an uplink transmission from the wireless device 105. If the wireless device 101 yields to the wireless device 105 via a CCA, the wireless device 101 may not start a transmission in the middle of a transmission from the wireless device 105. Although this disclosure describes determining a first wireless device may not yield to a second wireless device in a particular manner, this disclosure contemplates determining a first wireless device may not yield to a second wireless device in any suitable manner.

In particular embodiments, the wireless network apparatus 130 may determine particular wireless devices are not likely to yield to each other based on information from a location server. When two wireless devices are located farther than a threshold distance from each other, a probability that the wireless devices yield to each other may be lower than a threshold probability. The wireless network apparatus 130 may determine a first wireless device may not yield to a second wireless device based on location information of the first and the second wireless devices from a location server. As an example and not by way of limitation, illustrated in FIG. 1B, the access point 130 may determine that the wireless device 104 does not yield to the wireless device 108 based on location information received from a location server. The location server is not depicted in FIG. 1B. Although this disclosure describes determining a first wireless device may not yield to a second wireless device via CCA based on location information from a location server in a particular manner, this disclosure contemplates determining a first wireless device may not yield to a second wireless device via CCA based on location information from a location server in any suitable manner.

In particular embodiments, the wireless network apparatus 130 may determine particular wireless devices are not likely to yield to each other based on information from a second wireless network apparatus 130. The second wireless network apparatus 130 may be an access point in the WLAN. The second wireless network may inform the wireless network apparatus 130 a reception signal strength from a wireless device. Based on the reception signal strength observed at the wireless network apparatus 130 and the informed reception signal strength at the second network apparatus, the wireless network apparatus 130 may estimate a location of the wireless device. When the estimated locations of two wireless devices based on information received from the second wireless network apparatus are located farther than a threshold distance, the wireless network apparatus 130 may determine that the two wireless devices may not yield to each other via a CCA. As an example and not by way of limitation, illustrated in FIG. 1B, the access point 130 may observe reception signal strengths for uplink signals from wireless device 103 and 107. The access point 130 may request a second access point, not shown in FIG. 1B, observed reception signal strengths for signals from the wireless devices 103 and 107. The location of the second access point may be already known to the access point 130. Based on the observed reception signal strengths and received reception signal strengths from the second access point, the access point 130 may be able to estimate locations of the wireless device 103 and 107. If a distance between the estimated location of wireless device 103 and the estimated location of wireless device 107 is larger than a threshold distance, the access point 130 may determine that the wireless devices 103 and 107 may not yield to each other via a CCA. Although this disclosure describes determining that a first wireless device and a second wireless device may not yield to each other via a CCA based on information from another wireless network apparatus in a particular manner, this disclosure contemplates determining that a first wireless device and a second wireless device may not yield to each other via a CCA based on information from another wireless network apparatus in any suitable manner.

In particular embodiments, the wireless network apparatus 130 may identify the subset of the plurality of wireless devices by determining whether the wireless network apparatus 130 can decode uplink signals simultaneously transmitted by the wireless devices over a common uplink resource. In particular embodiments, the wireless network apparatus 130 may determine that uplink signals transmitted over a common channel from two wireless devices can be decoded when the wireless network apparatus 130 receives simultaneous uplink signals from the two wireless devices over a channel and decodes the received signals successfully. As an example and not by way of limitation, illustrated in FIG. 1B, the access point 130 may receive simultaneous uplink signals over a common channel from wireless devices 104 and 108. The access point 130 may be able to decode the both of the uplink transmissions successfully. Then, the access point 130 may determine that simultaneous uplink transmissions from the wireless devices 104 and 108 can be decoded. Since the access point 130 have already determined that the wireless devices 104 and 108 do not yield to each other via a CCA, the access point 130 may identify the wireless devices 104 and 108 as a subset. Although this disclosure describes identifying a subset of the plurality of wireless devices by determining whether simultaneously transmitted uplink signals over a common uplink resource by the wireless devices can be decoded in a particular manner, this disclosure contemplates identifying a subset of the plurality of wireless devices by determining whether simultaneously transmitted uplink signals over a common uplink resource by the wireless devices can be decoded in any suitable manner.

In particular embodiments, to determine simultaneously transmitted uplink signals by a first wireless device and a second wireless device over a common uplink resource can be decoded, the wireless apparatus may transmit steered Ready-To-Send (RTS) messages to the first wireless device and the second wireless device simultaneously. The steered RTS to the first wireless device may not interfere with the steered RTS to the second wireless device. The steered RTS messages may be sent simultaneously using one of DL MU-MIMO techniques. The wireless network apparatus 130 may receive a Clear-To-Send (CTS) message from each of the wireless devices. The wireless network apparatus 130 may determine that simultaneously transmitted uplink signals from the first wireless device and the second wireless device may be decoded if CTS messages from the first wireless device and the second wireless device are successfully decoded. As an example and not by way of limitation, illustrated in FIG. 1B, the access point 130 may have determined that wireless devices 102 and 106 do not yield to each other via a CCA. The access point 130 may need to ensure that the simultaneous uplink transmissions from the wireless devices 102 and 106 can be decoded by the access point 130 before the access point 130 identifies the wireless devices 102 and 106 as a subset. The access point 130 may send simultaneous steered RTS messages to both wireless device 102 and wireless device 106. If the access point 130 receives uplink signals from both 102 and 106 at the same time and successfully decodes the signals to CTS message, the access point 130 may determine that the uplink signals simultaneously transmitted over a common channel from wireless devices 102 and 106 can be decoded. Thus, the access point 130 may identify the wireless device 102 and 106 as a subset. Although this disclosure describes determining whether simultaneous uplink signals from a plurality of wireless devices can be decoded successfully using simultaneous steered RTS messages in a particular manner, this disclosure contemplates determining whether simultaneous uplink signals from a plurality of wireless devices can be decoded successfully using simultaneous steered RTS messages in any suitable manner.

In particular embodiments, the wireless network apparatus 130 may determine whether a Carrier Frequency Offset (CFO) separation exists between simultaneously transmitted uplink signals from wireless devices to determine that uplink signals simultaneously transmitted by the wireless devices over a common uplink resource may be decoded. A CFO separation between signals may enable the wireless network apparatus 130 to decode each signal successfully. When the wireless network apparatus 130 observes a CFO separation between uplink signals from a first wireless device and a second wireless device, the wireless network apparatus 130 may determine that simultaneous uplink transmissions from the first wireless device and the second wireless device may be decoded. Thus, the wireless network apparatus 130 may identify the first wireless device and the second wireless device as a subset. As an example and not by way of limitation, illustrated in FIG. 1B, the access point 130 may observe a CFO separation between uplink signals from wireless device 101 and wireless device 105. The access point 130 may determine that simultaneous uplink transmissions from the wireless device 101 and the wireless device 105 may be decoded. Thus, the wireless network apparatus 130 may identify the wireless device 101 and the wireless device 105 as a subset. Although this disclosure describes determining that simultaneous transmissions from a first wireless device and a second wireless device can be decoded if a CFO separation between the signals from the first wireless device and the second wireless device is observed in a particular manner, this disclosure contemplates determining that simultaneous transmissions from a first wireless device and a second wireless device can be decoded if a CFO separation between the signals from the first wireless device and the second wireless device is observed in any suitable manner.

In particular embodiments, the wireless network apparatus 130 may determine that a difference of reception signal strengths between two simultaneously transmitted uplink signals are within a pre-determined range to determine whether the two simultaneously transmitted uplink signals by the wireless devices over a common uplink resource can be decoded. If a ratio between a first reception signal strength for a first uplink signal from a first wireless device and a second reception signal strength for a second uplink signal from a second wireless device is larger than a threshold ratio, the wireless network apparatus 130 may not be able to decode the second signal. The wireless network apparatus 130 may determine that simultaneous uplink transmissions from a first wireless device and a second wireless device can be decoded only when a reception-signal-strength ratio between a first uplink signal from the first wireless device and a second uplink signal from the second wireless device is within a pre-determined range. As an example and not by way of limitation, illustrated in FIG. 1B, the access point 130 may receive simultaneous uplink transmissions from wireless device 101 and wireless device 105. A ratio between a reception signal strength for signals from the wireless device 101 and a reception signal strength for signals from the wireless device 105 is within a predetermined range. Thus, the access point 130 may determine that simultaneous uplink transmissions from the wireless device 101 and the wireless device 105 can be decoded. The access point 130 may identify the wireless device 101 and the wireless device 105 as a subset. As another example and not by way of limitation, illustrated in FIG. 1B, the access point 130 may receive simultaneous uplink transmissions from wireless device 101 and wireless device 110. A ratio between a reception signal strength for signals from the wireless device 101 and a reception signal strength for signals from the wireless device 110 is out of the predetermined range because the reception signal strength for the signals from the wireless device 110 is much higher than the reception signal strength for the signals from the wireless device 101. The access point 130 may not be able to decode uplink transmission from the wireless device 101. The access point 130 may not determine that simultaneous uplink transmissions from the wireless device 101 and the wireless device 110 can be decoded. As a result, the access point 130 may not identify the wireless device 101 and wireless device 110 as a subset. Although this disclosure describes determining that simultaneous uplink transmissions from a first wireless device and a second wireless device can be decoded based on a reception-signal-strength ratio between uplink signals from the first wireless device and the second wireless device in a particular manner, this disclosure contemplates determining that simultaneous uplink transmissions from a first wireless device and a second wireless device can be decoded based on a reception-signal-strength ratio between uplink signals from the first wireless device and the second wireless device in any suitable manner.

Figure 2:
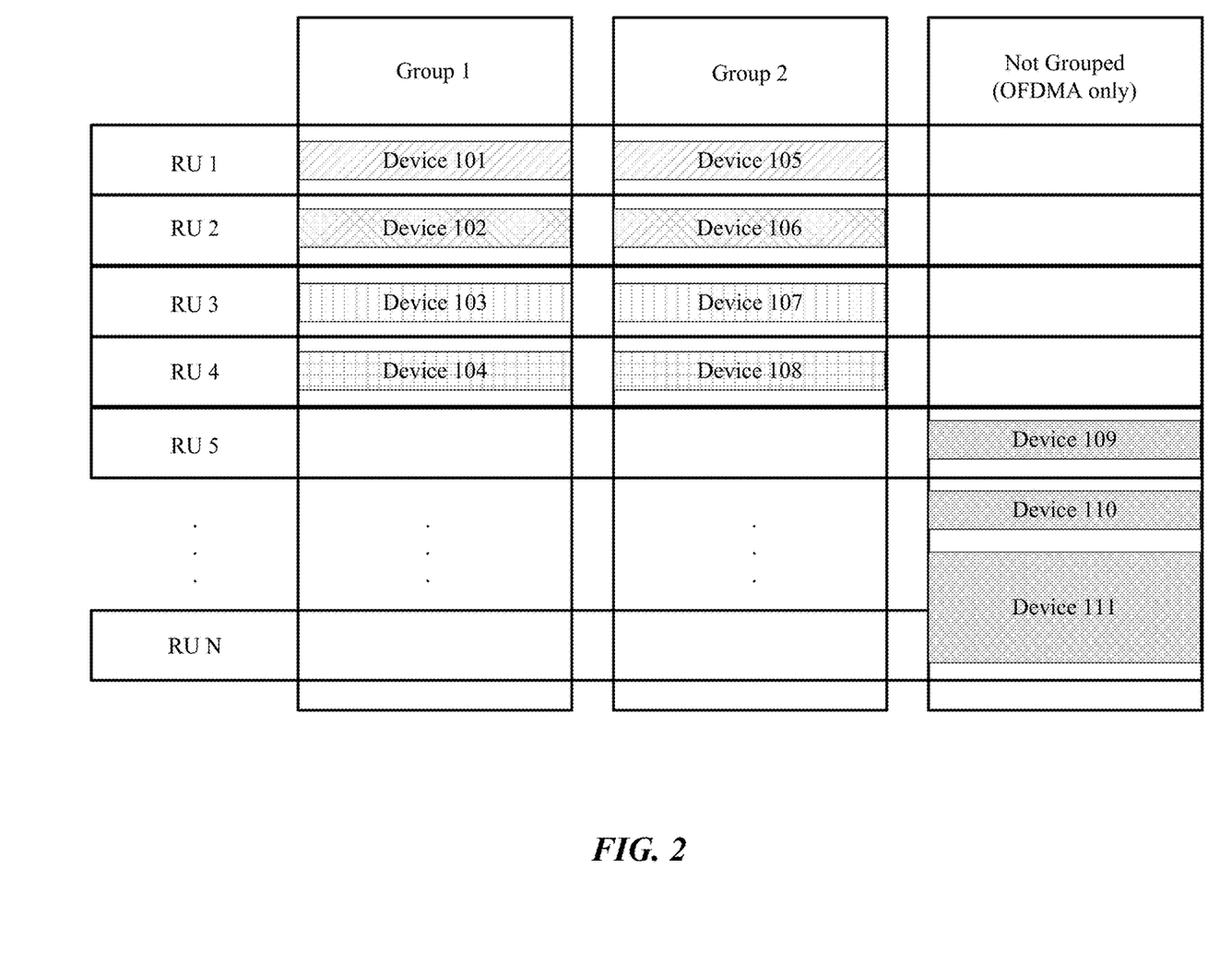
FIG. 2 illustrates an example allocation of uplink resource to the wireless devices.

In particular embodiments, the wireless network apparatus 130 may assign the subset to an uplink resource. The uplink resource may comprise one or more Orthogonal Frequency Division Multiplexing (OFDM) sub-carriers. FIG. 2 illustrates an example allocation of uplink resource to the wireless devices. As an example and not by way of limitation, illustrated in FIG. 2, the access point 130 may assign a resource unit (RU) 1 to a subset of wireless devices 101, 105 and 109. In FIG. 2, the wireless device 109 is associated with RU 5, which will be explained later. The access point 130 may assign an RU 2 to a subset of wireless device 102 and 106. The access point 130 may assign an RU 3 to a subset of wireless device 103 and 107. The access point 130 may assign an RU 4 to a subset of wireless device 104 and 108. In particular embodiments, a resource unit may comprise an OFDM sub-carrier. The access point 130 may assign one or more resource units to a subset. Although this disclosure describes assigning an uplink resource to a subset of wireless devices in a particular manner, this disclosure contemplates assigning an uplink resource to a subset of wireless devices in any suitable manner.

In particular embodiments, a first wireless device assigned to a first uplink resource may not yield to a second wireless device via a CCA if the second wireless device is assigned to a second uplink resource that is different from the first uplink resource. The first wireless device may listen for RF transmissions only on the first uplink resource for a CCA because the first wireless device is assigned to the first uplink resource. Thus, the first wireless device may not yield to the second wireless device that transmits over the second uplink resource that is different from the first uplink resource. As an example and not by way of limitation, illustrated in FIG. 2, the access point 130 assigned RU 1 to the wireless device 101 and assigned RU 2 to the wireless device 102. Though the wireless device 101 and the wireless device 102 may locate close to each other, an uplink transmission over RU 2 from the wireless device 102 may not cause the wireless device 101 to yield via a CCA because the wireless device 101 listens for RF signals only over RU 1. Although this disclosure describes preventing a first wireless device and a second wireless device from yielding to each other via a CCA by assigning different uplink resources to the first wireless device and the second wireless device in a particular manner, this disclosure contemplates preventing a first wireless device and a second wireless device from yielding to each other via a CCA by assigning different uplink resources to the first wireless device and the second wireless device in any suitable manner.

In particular embodiments, the wireless network apparatus 130 may separate each wireless device in the subset to each of a plurality of groups such that no two wireless devices in a subset may be associated with a common group. A group may comprise wireless devices that are able to receive data on a common steered downlink message from the wireless network apparatus 130. As an example and not by way of limitation, illustrated in FIG. 2, the access point 130 may separate wireless devices that are associated with subsets, respectively, into two groups. The access point 130 may put the wireless devices 101, 102, 103 and 104 into the group 1 and put the wireless devices 105, 106, 107 and 108 into the group 2. Though the wireless device 109 was identified as a subset along with the wireless device 101 and 105, the wireless device 109 may not be associated with a group for one or more reasons. In particular embodiments, the access point 130 may determine to have two groups. Because the subset associated with the wireless device 109 comprises three wireless devices while only two groups are available, the wireless device 109 may not be associated with any group. In particular embodiments, the wireless device 109 may not be able to receive data on a steered downlink message either to the group 1 or to the group 2. Thus, the wireless device 109 may not be associated with a group. Although this disclosure describes separating wireless devices into a plurality of groups in a particular manner, this disclosure contemplates separating wireless devices into a plurality of groups in any suitable manner.

In particular embodiments, the wireless network apparatus 130 may assign an uplink resource that is not assigned to any other wireless devices to each wireless device not associated with any group. The wireless network apparatus 130 may transmit a downlink message indicating the assigned uplink resource for each wireless device. As an example and not by way of limitation, illustrated in FIG. 2, the access point 130 may assign RU 5 to wireless device 109. The access point 130 may assign one or more RUs that are not assigned to any wireless device to wireless devices 110 and 111 because the wireless device 110 and 111 are not associated with any group. Although this disclosure describes assigning an uplink resource to a wireless device that is not associated with any group in a particular manner, this disclosure contemplates assigning an uplink resource to a wireless device that is not associated with any group in any suitable manner.

In particular embodiments, the wireless network apparatus 130 may transmit a steered downlink message to a group. The downlink steered message may be a trigger message. The trigger message may comprise a modulation and coding scheme (MCS) to be used by each of the wireless devices.

Figure 3:
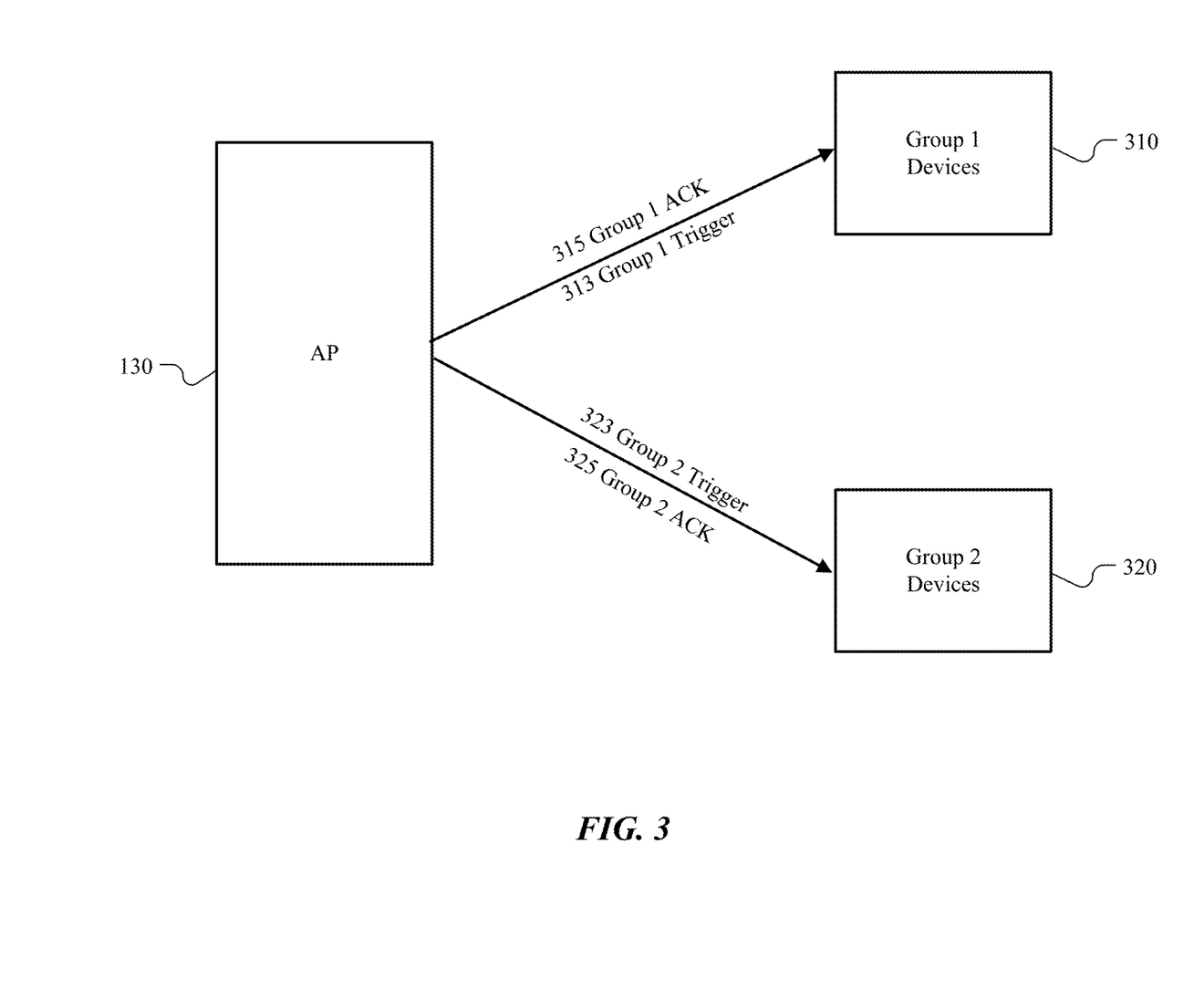
FIG. 3 illustrates example steered messages to corresponding groups of wireless devices.

The trigger messages to the plurality of groups may be transmitted simultaneously. The trigger message may indicate the assigned uplink resource for each wireless device in the group. The steered downlink message is decodable by wireless devices in a group to which the steered message is transmitted, while the steered downlink message is not decodable by any wireless device from another group. The wireless devices in each group may be assigned to different uplink resources. FIG. 3 illustrates example steered messages to corresponding groups of wireless devices. As an example and not by way of limitation, illustrated in FIG. 3, the access point 130 may send a steered trigger message 313 to the wireless devices 310 in group 1. The steered trigger message 313 to the wireless devices 310 in group 1 may not be successfully received by any device that is not associated with the group 1. The access point 130 may also send a steered trigger message 323 to the wireless devices 320 in group 2. The steered trigger message 323 may not be successfully received by any device that is not associated with the group 2. The access point 130 may send the steered trigger messages 313 and 323 at the same time. The steered trigger message 313 may comprise uplink resource assigned to each wireless device in group 1. For example, RU 1 for wireless device 101, RU 2 for wireless device 102, RU 3 for wireless device 103 and RU 4 for wireless device 104. The steered trigger message 313 may also comprise a modulation and coding scheme (MCS) to be used by each of the wireless devices. On receiving the steered trigger message 313, each wireless device in group 1 may configure the transmission radio associated with the wireless device. Though RU 1 was assigned to both wireless device 101 and wireless device 105, the wireless device 101 may consider that RU 1 is exclusively assigned to the wireless device 101 because the wireless device 101 may not be able to receive the steered trigger message 323 that is destined to the wireless devices 320 in group 2. In particular embodiments, the access point 130 may transmit a trigger message to the wireless devices that are not associated with any group. The trigger message may not be a steered message. Thus, any wireless device in the network may receive the trigger message. Although this disclosure describes transmitting a steered trigger message to a group of wireless devices in a particular manner, this disclosure contemplates transmitting a steered trigger message to a group of wireless devices in any suitable manner.

In particular embodiments, the wireless network apparatus 130 may receive uplink messages from wireless devices of the plurality of groups. Each uplink message may be transmitted over an uplink resource assigned to the transmitting wireless device. The wireless network apparatus 130 may transmit a downlink steered acknowledgement message to a group. The downlink steered acknowledgement message may comprise acknowledgements for all the successfully received uplink messages from the wireless devices in the group. As an example and not by way of limitation, illustrated in FIG. 3, continuing with a prior example, the access point 130 may receive uplink messages from the wireless devices in group 1 and group 2 after sending the steered trigger messages 313 and 323. Each of the wireless devices may transmit uplink messages using the uplink resource assigned to the wireless device. On receiving a plurality of uplink messages from a plurality of wireless devices, the access point 130 may send steered ACK messages. The access point 130 may send a steered ACK 315 to the wireless devices 310 in group 1. The steered ACK 315 may comprise acknowledgements for successfully received uplink messages from the wireless devices 310 in group 1. The access point 130 may send a steered ACK 325 to the wireless devices 320 in group 2. The steered ACK 325 may comprise acknowledgements for successfully received uplink messages from the wireless devices 320 in group 2. Although this disclosure describes transmitting a steered ACK to a group of wireless devices in a particular manner, this disclosure contemplates transmitting a steered ACK to a group of wireless devices in any suitable manner.

Figure 4:
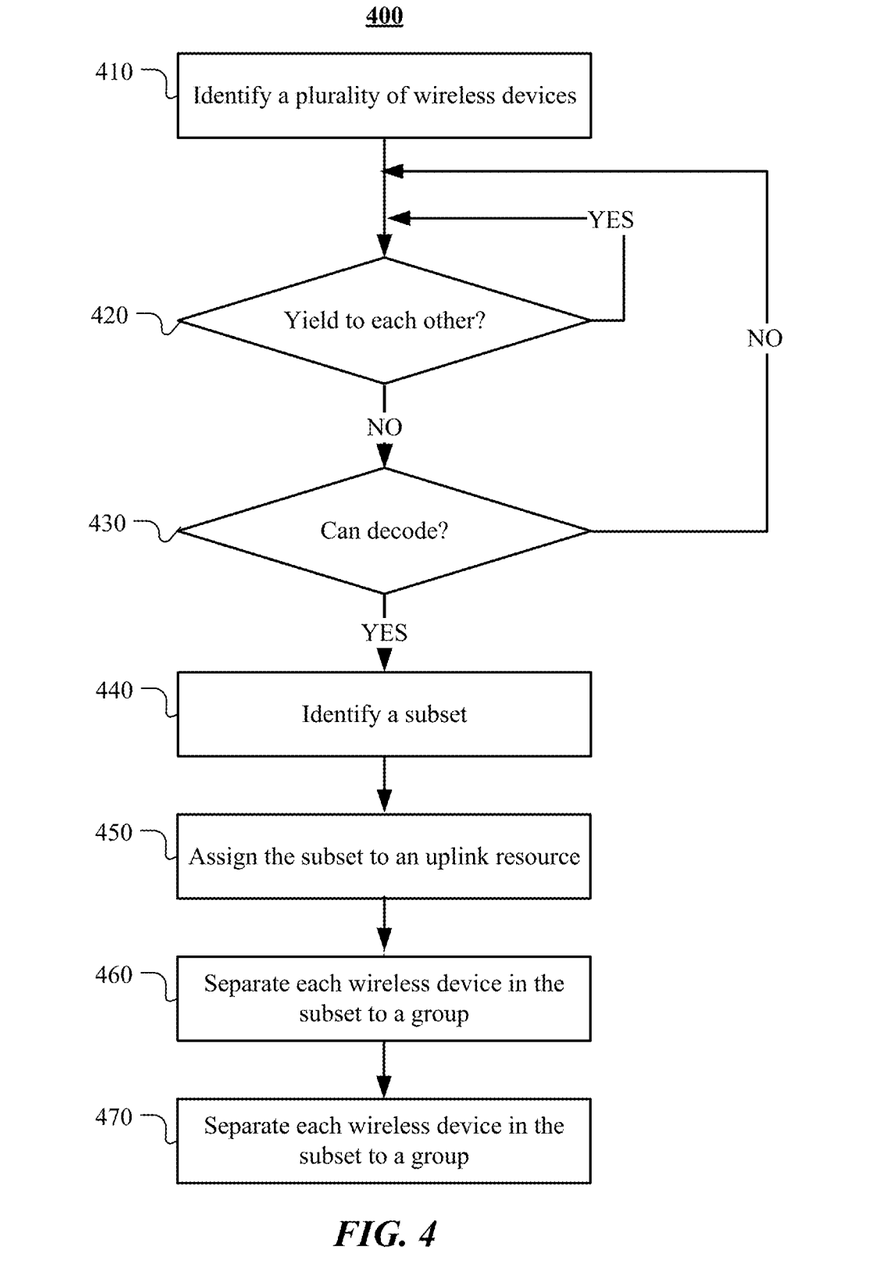
FIG. 4 illustrates an example method for enabling UL MU-MIMO with steered DL control messages in WLANs.

FIG. 4 illustrates an example method 400 for enabling UL MU-MIMO with steered DL control messages in WLANs. The method may begin at step 410, where a wireless network apparatus may identify a plurality of wireless devices associated with the wireless network apparatus. At step 420, the wireless network apparatus may determine whether the wireless devices in the subset have a probability above a threshold to yield to each other via a clear channel assessment (CCA). At step 430, the wireless network apparatus may determine whether the wireless network apparatus can decode uplink signals simultaneously transmitted by the wireless devices in the subset over a common uplink resource. At step 440, the wireless network apparatus may identify a subset of the plurality of wireless devices based on whether the wireless devices in the subset have a probability above a threshold to yield to each other via a clear channel assessment (CCA) and whether the wireless network apparatus can decode uplink signals simultaneously transmitted by the wireless devices in the subset over a common uplink resource. At step 450, the wireless network apparatus may assign the subset to an uplink resource. The uplink resource may comprise one or more sub-carriers. At step 460, the wireless network apparatus may separate each wireless device in the subset to each of a plurality of groups. A group may comprise wireless devices that are able to receive data on a common steered downlink message from the wireless network apparatus. At step 470, the wireless network apparatus may transmit, for each group, a steered downlink message indicating the assigned uplink resource for each wireless device in the group. The wireless devices in each group may be assigned to different uplink resources. Particular embodiments may repeat one or more steps of the method of FIG. 4, where appropriate. Although this disclosure describes and illustrates particular steps of the method of FIG. 4 as occurring in a particular order, this disclosure contemplates any suitable steps of the method of FIG. 4 occurring in any suitable order. Moreover, although this disclosure describes and illustrates an example method for enabling UL MU-MIMO with steered DL control messages in WLANs including the particular steps of the method of FIG. 4, this disclosure contemplates any suitable method for enabling UL MU-MIMO with steered DL control messages in WLANs including any suitable steps, which may include all, some, or none of the steps of the method of FIG. 4, where appropriate. Furthermore, although this disclosure describes and illustrates particular components, devices, or systems carrying out particular steps of the method of FIG. 4, this disclosure contemplates any suitable combination of any suitable components, devices, or systems carrying out any suitable steps of the method of FIG. 4.

Systems and Methods

Figure 5:
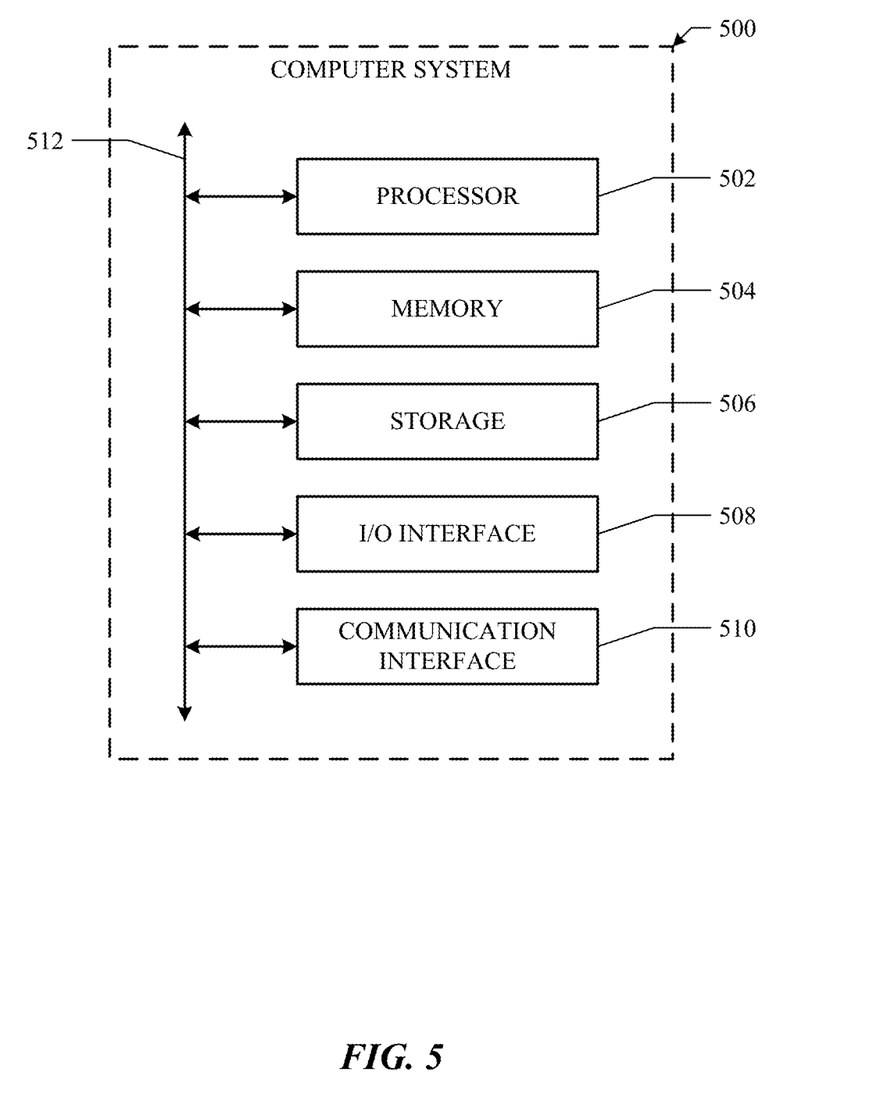
FIG. 5 illustrates an example computer system.

FIG. 5 illustrates an example computer system 500. In particular embodiments, one or more computer systems 500 perform one or more steps of one or more methods described or illustrated herein. In particular embodiments, one or more computer systems 500 provide functionality described or illustrated herein. In particular embodiments, software running on one or more computer systems 500 performs one or more steps of one or more methods described or illustrated herein or provides functionality described or illustrated herein. Particular embodiments include one or more portions of one or more computer systems 500. Herein, reference to a computer system may encompass a computing device, and vice versa, where appropriate. Moreover, reference to a computer system may encompass one or more computer systems, where appropriate.

This disclosure contemplates any suitable number of computer systems 500. This disclosure contemplates computer system 500 taking any suitable physical form. As example and not by way of limitation, computer system 500 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 500 may include one or more computer systems 500; be unitary or distributed; span multiple locations; span multiple machines; span multiple data centers; or reside in a cloud, which may include one or more cloud components in one or more networks. Where appropriate, one or more computer systems 500 may perform without substantial spatial or temporal limitation one or more steps of one or more methods described or illustrated herein. As an example and not by way of limitation, one or more computer systems 500 may perform in real time or in batch mode one or more steps of one or more methods described or illustrated herein. One or more computer systems 500 may perform at different times or at different locations one or more steps of one or more methods described or illustrated herein, where appropriate.

In particular embodiments, computer system 500 includes a processor 502, memory 504, storage 506, an input/output (I/O) interface 508, a communication interface 510, and a bus 512. Although this disclosure describes and illustrates a particular computer system having a particular number of particular components in a particular arrangement, this disclosure contemplates any suitable computer system having any suitable number of any suitable components in any suitable arrangement.

In particular embodiments, processor 502 includes hardware for executing instructions, such as those making up a computer program. As an example and not by way of limitation, to execute instructions, processor 502 may retrieve (or fetch) the instructions from an internal register, an internal cache, memory 504, or storage 506; decode and execute them; and then write one or more results to an internal register, an internal cache, memory 504, or storage 506. In particular embodiments, processor 502 may include one or more internal caches for data, instructions, or addresses. This disclosure contemplates processor 502 including any suitable number of any suitable internal caches, where appropriate. As an example and not by way of limitation, processor 502 may include one or more instruction caches, one or more data caches, and one or more translation lookaside buffers (TLBs). Instructions in the instruction caches may be copies of instructions in memory 504 or storage 506, and the instruction caches may speed up retrieval of those instructions by processor 502. Data in the data caches may be copies of data in memory 504 or storage 506 for instructions executing at processor 502 to operate on; the results of previous instructions executed at processor 502 for access by subsequent instructions executing at processor 502 or for writing to memory 504 or storage 506; or other suitable data. The data caches may speed up read or write operations by processor 502. The TLBs may speed up virtual-address translation for processor 502. In particular embodiments, processor 502 may include one or more internal registers for data, instructions, or addresses. This disclosure contemplates processor 502 including any suitable number of any suitable internal registers, where appropriate. Where appropriate, processor 502 may include one or more arithmetic logic units (ALUs); be a multi-core processor; or include one or more processors 502. Although this disclosure describes and illustrates a particular processor, this disclosure contemplates any suitable processor.

In particular embodiments, memory 504 includes main memory for storing instructions for processor 502 to execute or data for processor 502 to operate on. As an example and not by way of limitation, computer system 500 may load instructions from storage 506 or another source (such as, for example, another computer system 500) to memory 504. Processor 502 may then load the instructions from memory 504 to an internal register or internal cache. To execute the instructions, processor 502 may retrieve the instructions from the internal register or internal cache and decode them. During or after execution of the instructions, processor 502 may write one or more results (which may be intermediate or final results) to the internal register or internal cache. Processor 502 may then write one or more of those results to memory 504. In particular embodiments, processor 502 executes only instructions in one or more internal registers or internal caches or in memory 504 (as opposed to storage 506 or elsewhere) and operates only on data in one or more internal registers or internal caches or in memory 504 (as opposed to storage 506 or elsewhere). One or more memory buses (which may each include an address bus and a data bus) may couple processor 502 to memory 504. Bus 512 may include one or more memory buses, as described below. In particular embodiments, one or more memory management units (MMUs) reside between processor 502 and memory 504 and facilitate accesses to memory 504 requested by processor 502. In particular embodiments, memory 504 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 504 may include one or more memories 504, where appropriate. Although this disclosure describes and illustrates particular memory, this disclosure contemplates any suitable memory.

In particular embodiments, storage 506 includes mass storage for data or instructions. As an example and not by way of limitation, storage 506 may include a hard disk drive (HDD), a floppy disk drive, flash memory, an optical disc, a magneto-optical disc, magnetic tape, or a Universal Serial Bus (USB) drive or a combination of two or more of these. Storage 506 may include removable or non-removable (or fixed) media, where appropriate. Storage 506 may be internal or external to computer system 500, where appropriate. In particular embodiments, storage 506 is non-volatile, solid-state memory. In particular embodiments, storage 506 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 506 taking any suitable physical form. Storage 506 may include one or more storage control units facilitating communication between processor 502 and storage 506, where appropriate. Where appropriate, storage 506 may include one or more storages 506. Although this disclosure describes and illustrates particular storage, this disclosure contemplates any suitable storage.

In particular embodiments, I/O interface 508 includes hardware, software, or both, providing one or more interfaces for communication between computer system 500 and one or more I/O devices. Computer system 500 may include one or more of these I/O devices, where appropriate. One or more of these I/O devices may enable communication between a person and computer system 500. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 508 for them. Where appropriate, I/O interface 508 may include one or more device or software drivers enabling processor 502 to drive one or more of these I/O devices. I/O interface 508 may include one or more I/O interfaces 508, where appropriate. Although this disclosure describes and illustrates a particular I/O interface, this disclosure contemplates any suitable I/O interface.

In particular embodiments, communication interface 510 includes hardware, software, or both providing one or more interfaces for communication (such as, for example, packet-based communication) between computer system 500 and one or more other computer systems 500 or one or more networks. As an example and not by way of limitation, communication interface 510 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 510 for it. As an example and not by way of limitation, computer system 500 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 500 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network, a Long-Term Evolution (LTE) network, or a 5G network), or other suitable wireless network or a combination of two or more of these. Computer system 500 may include any suitable communication interface 510 for any of these networks, where appropriate. Communication interface 510 may include one or more communication interfaces 510, where appropriate. Although this disclosure describes and illustrates a particular communication interface, this disclosure contemplates any suitable communication interface.

In particular embodiments, bus 512 includes hardware, software, or both coupling components of computer system 500 to each other. As an example and not by way of limitation, bus 512 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 512 may include one or more buses 512, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method by a wireless network apparatus, comprising:
   identifying a plurality of wireless devices associated with the wireless network apparatus;
   identifying a subset of the plurality of wireless devices based on:

whether the wireless devices in the subset have a probability above a threshold to yield to each other via a clear channel assessment (CCA); and whether the wireless network apparatus can decode uplink signals simultaneously transmitted by the wireless devices in the subset over a common uplink resource;

assigning the subset to an uplink resource, wherein the uplink resource comprises one or more sub-carriers;

separating each wireless device in the subset to each of a plurality of groups, wherein a group comprises wireless devices that are able to receive data on a common steered downlink message from the wireless network apparatus; and transmitting, for each group, a steered downlink message indicating the assigned uplink resource for each wireless device in the group, wherein the wireless devices in each group are assigned to different uplink resources.

2. The method of claim 1, further comprising:

receiving uplink messages from wireless devices of the plurality of groups, wherein each of the uplink messages is transmitted over an uplink resource assigned to the transmitting wireless device; and transmitting, for each group, a downlink steered acknowledgement message comprising acknowledgements for the received uplink messages from the wireless devices in the group.

3. The method of claim 1, wherein the steered downlink message is decodable by wireless devices in the corresponding group to which the steered message is transmitted, while the steered downlink message is not decodable by any wireless device from another group.

4. The method of claim 1, wherein the plurality of wireless devices are associated with one or more uplink data messages to the wireless network apparatus.

5. The method of claim 4, wherein determining that the plurality of wireless devices are associated with the one or more uplink data messages comprises receiving buffer status reports from the plurality of wireless devices.

6. The method of claim 1, wherein identifying the subset of the plurality of wireless devices comprises identifying wireless devices that do not yield to each other via a CCA.

7. The method of claim 6, wherein a first wireless device is determined not to yield to a second wireless device via a CCA if an uplink message from the first wireless device arrives at the wireless network apparatus while an uplink message from the second wireless device is being received.

8. The method of claim 6, wherein wireless devices are determined not to yield to each other based on information from a location server.

9. The method of claim 1, wherein identifying the subset of the plurality of wireless devices comprises determining whether the wireless network apparatus can decode uplink signals simultaneously transmitted by the wireless devices over a common uplink resource.

10. The method of claim 9, wherein determining simultaneously transmitted uplink signals by a first wireless device and a second wireless device over a common uplink resource can be decoded by the wireless apparatus comprises:

simultaneously transmitting steered Ready-To-Send (RTS) messages to the first wireless device and the second wireless device, wherein the steered RTS to the first wireless device does not interfere with the steered RTS to the second wireless device;

receiving, from each of the wireless devices, a Clear-To-Send (CTS) message; and determining that simultaneously transmitted uplink signals from the first wireless device and the second wireless device are decoded if CTS messages from the first wireless device and the second wireless device are successfully decoded.

11. The method of claim 9, wherein uplink signals simultaneously transmitted by wireless devices over a common uplink resource are determined to be decoded if a Carrier Frequency Offset (CFO) separation exists between simultaneously transmitted uplink signals.

12. The method of claim 9, wherein determining whether the wireless network apparatus can decode uplink signals simultaneously transmitted by the wireless devices over a common uplink resource comprises determining that differences of reception signal strengths between the simultaneously transmitted uplink signals are within a pre-determined range.

13. The method of claim 1, wherein the downlink steered message is a trigger message, wherein the trigger message comprises a modulation and coding scheme (MCS) to be used by each of the wireless devices.

14. The method of claim 13, wherein the trigger messages to the plurality of groups are transmitted simultaneously.

15. The method of claim 1, wherein a first wireless device assigned to a first uplink resource do not yield to a second wireless device via a CCA if the second wireless device is assigned to a second uplink resource that is different from the first uplink resource.

16. The method of claim 1, further comprising:

assigning, to each wireless device that is not associated with any group, an uplink resource that is not assigned to any other wireless devices; and transmitting a downlink message indicating the assigned uplink resource for each wireless device.

17. One or more computer-readable non-transitory storage media embodying software that is operable when executed to:

identify a plurality of wireless devices associated with the wireless network apparatus;

identify a subset of the plurality of wireless devices based on:

whether the wireless devices in the subset have a probability above a threshold to yield to each other via a clear channel assessment (CCA); and whether the wireless network apparatus can decode uplink signals simultaneously transmitted by the wireless devices in the subset over a common uplink resource;

assign the subset to an uplink resource, wherein the uplink resource comprises one or more sub-carriers;

separate each wireless device in the subset to each of a plurality of groups, wherein a group comprises wireless devices that are able to receive data on a common steered downlink message from the wireless network apparatus; and transmit, for each group, a steered downlink message indicating the assigned uplink resource for each wireless device in the group, wherein the wireless devices in each group are assigned to different uplink resources.

18. The media of claim 17, wherein the software is further operable when executed to:

receive uplink messages from wireless devices of the plurality of groups, wherein each of the uplink messages is transmitted over an uplink resource assigned to the transmitting wireless device; and transmit, for each group, a downlink steered acknowledgement message comprising acknowledgements for all the successfully received uplink messages from the wireless devices in the group.

19. The media of claim 17, wherein the steered downlink message is decodable by wireless devices in the corresponding group to which the steered message is transmitted, while the steered downlink message is not decodable by any wireless device from another group.

20. A system comprising: one or more processors; and a non-transitory memory coupled to the processors comprising instructions executable by the processors, the processors operable when executing the instructions to:
  identify a plurality of wireless devices associated with the wireless network apparatus;
  identify a subset of the plurality of wireless devices based on:
    whether the wireless devices in the subset have a probability above a threshold to yield to each other via a clear channel assessment (CCA); and
    whether the wireless network apparatus can decode uplink signals simultaneously transmitted by the wireless devices in the subset over a common uplink resource;
  assign the subset to an uplink resource, wherein the uplink resource comprises one or more sub-carriers;
  separate each wireless device in the subset to each of a plurality of groups, wherein a group comprises wireless devices that are able to receive data on a common steered downlink message from the wireless network apparatus; and
  transmit, for each group, a steered downlink message indicating the assigned uplink resource for each wireless device in the group, wherein the wireless devices in each group are assigned to different uplink resources.

* * * * *

UNITED STATES PATENT AND TRADEMARK OFFICE
CERTIFICATE OF CORRECTION

PATENT NO. : 10,659,116 B1
APPLICATION NO. : 16/559353
DATED : May 19, 2020
INVENTOR(S) : Matthew Aaron Silverman, Gautam Bhanage and Pooya Monajemi It is certified that error appears in the above-identified patent and that said Letters Patent is hereby corrected as shown below:

On the Title Page

In item (72), under "Inventors", in Column 1, Line 2, delete "Guatam" and insert --Gautam--, therefor.

Signed and Sealed this
Eleventh Day of August, 2020

Andrei Iancu
*Director of the United States Patent and Trademark Office*